United States Patent [19]

Eatwell et al.

[11] 4,408,092

[45] Oct. 4, 1983

[54] ELECTRICAL FEEDTHROUGH

[75] Inventors: William D. Eatwell; James K. Garner, Jr., both of Houston, Tex.

[73] Assignee: Camco, Incorporated, Houston, Tex.

[21] Appl. No.: 345,897

[22] Filed: Feb. 4, 1982

[51] Int. Cl.³ .................................................. H02G 15/117
[52] U.S. Cl. .................................... 174/88 R; 174/91; 339/248 S; 339/273 R
[58] Field of Search ............................. 174/88 R, 91; 339/248 S, 273 R

[56] References Cited

U.S. PATENT DOCUMENTS

| | | | |
|---|---|---|---|
| 1,941,715 | 1/1934 | Pfisterer | 339/248 S |
| 1,975,683 | 10/1934 | Childs | 339/273 R |
| 3,441,658 | 4/1969 | Stark et al. | 174/88 R |
| 3,444,505 | 5/1969 | Becker | 339/273 R |
| 3,836,699 | 9/1974 | Downing | 174/88 R |
| 3,951,503 | 4/1976 | Caulkins | 174/88 R |
| 4,073,559 | 2/1978 | Lawson, Jr. | 174/88 R |

*Primary Examiner*—A. T. Grimley
*Assistant Examiner*—Morris H. Nimmo
*Attorney, Agent, or Firm*—Fulbright & Jaworski

[57] ABSTRACT

An electrical power feedthrough connection for supporting and sealing a well electrical cable. A sealing insulator which is longitudinally split includes one or more cavities. An elongated connector is positioned in each cavity connecting the ends of two lines of the electrical cable with potting compound positioned in the cavity for sealing about the connector. A sealing grommet at each end of the insulator aligns the lines of the electrical cable with the cavities of the insulator. A cable gripping retainer is positioned adjacent each grommet remote from the insulator. A housing surrounds the insulator, grommet and retainers and includes first and second telescoping parts with threaded means for telescoping the first and second parts together. Coacting wedges are positioned between each of the housing parts and one of the retainers for causing the retainers to move inwardly and grip the cable when the first and second housing parts are telescoped together and coacting shoulders are provided between each of the housing parts and opposite ends of the insulator for compressing the insulator and sealing it about the connectors.

5 Claims, 2 Drawing Figures

ELECTRICAL FEEDTHROUGH

BACKGROUND OF THE INVENTION

Electrical power cables are provided to extend into a well for providing power to actuate various downhole electrical equipment such as pumps. Because of the installation of the various equipment in the well the cable must be installed in segmented lengths. Various types of cable feedthroughs have been provided in the past and the electrical connections have included various types of splice connections or pin and socket type connections. However, the environmental conditions encountered in a well installation subject the cable connections to unusual electrical and mechanical difficulties. The downhole environment includes adverse temperature, pressure, and hydrostatic shock conditions. The present invention is directed to an electrical power feedthrough connection for supporting and sealing a well electrical cable which provides a good electrical connection, increased sealing characteristics and a strong mechanical connection for removing any shock and/or load of the cable from the cable connection.

SUMMARY

The present invention is directed to an electrical power feedthrough for supporting and sealing a well electrical cable connection. The feedthrough includes a sealing insulator having a cavity for holding and sealing an electrical connection with a sealing grommet at each end of the insulator for aligning the electrical cable with the insulator. A cable gripping retainer is positioned adjacent each grommet end remote from the insulator. A housing surrounds the insulator, grommets and retainer and the housing includes first and second telescoping parts. Means are provided for telescoping the first and second parts together. Coacting wedge means are positioned each of the housing parts and one of the retainers for causing the retainers to grip the cable when the first and second housing parts are telescoped together.

Still a further object of the present invention is the provision of coacting shoulders between each of the housing parts in opposite ends of the insulator for compressing the insulator and increasing the sealing action of the insulator about the electrical connection.

Still a further object of the present invention is wherein the insulator is longitudinally split into a plurality of sections for receiving the electrical connection and cable.

Still a further object of the present invention is wherein at least one of the housing parts includes connecting means for connecting and supporting the feedthrough.

A still further object of the present invention is the provision of providing a power feedthrough for a multiple line well cable in which a resilient sealing insulator is longitudinally split and includes a plurality of cavities with a splice connector positioned in each cavity and with potting compound positioned in the cavity about the splice connectors.

Other and further objects, features and advantages will be apparent from the following description of a presently preferred embodiment of the invention, given for the purpose of disclosure and taken in conjunction with the accompanying drawing.

DESCRIPTION OF THE PREFERRED EMBODIMENT

Figure 1:
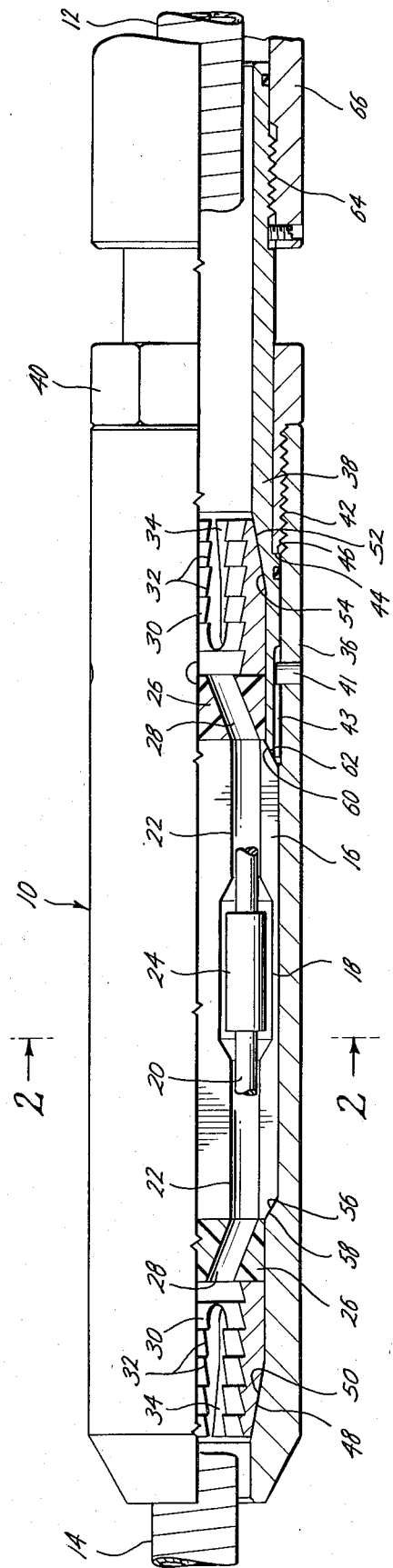
FIG. 1 is an elevational view, partly in cross section, of the electrical power feedthrough of the present invention.
Figure 2:
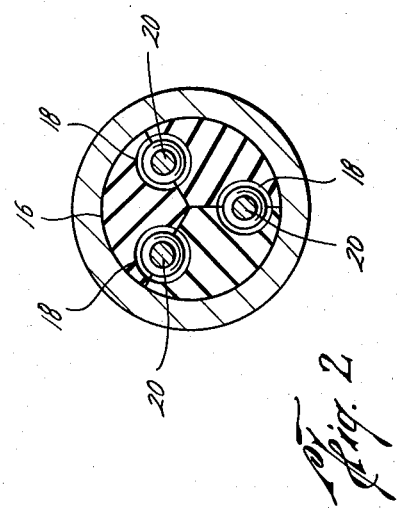
FIG. 2 is a cross-sectional view taken along the line 2—2 of FIG. 1.

Referring now to the drawing, the reference numeral 10 generally indicates the electrical power feedthrough connector of the present invention which is particularly adapted for connecting the ends of two cables 12 and 14, which are generally armored covered cable, for supplying electrical power downhole to various equipment such as a well pump. The feedthrough connector 10 connects the ends of the cables 12 and 14 together and provides the necessary structure to overcome the adverse pressure, temperature, hydrostatic shock and mechanical loading to which the electrical connection is subjected. A resilient sealing insulator 16 such as rubber is provided, as best seen in FIGS. 1 and 2, and is split into a plurality of segments depending upon the number of electrical conductor lines in the cables 12 and 14. For example, in connecting a three line cable, the number of segments is preferably three. The insulator 16 includes one or more cavities 18 depending upon the number of lines in the cables 12 and 14 to be connected. Assuming three lines 20 to be connected there are provided three cavities 18 the insulator 16 will also include a passageway 22 extending from each end of the cavities 18 for receiving the electrical lines 20. The electrical lines 20 from each of the conductors 12 and 14 are connected together in the cavity 18 by any suitable electrical connector such as a splice connector 24 which is conventional and may be part number 36886 sold by AMP Incorporated. After the connectors 24 are connected to the lines 20, the cavities 18 and passageways 22 are filled with a conventional potting compound for sealing about the electrical connectors 24. The potting compound is applied conventionally such as with a brush and allowed to dry.

A sealing grommet 26 is positioned at each end of the insulator 16 and includes a line passageway 28 for each of the lines 20 in the cables 12 and 14. The grommets 26 act as a seal around the lines 20 as well as aligning the lines 20 with the respective cavities 18 for making up the electrical connection 24 between the joined lines 20.

A cable gripping retainer 30 is provided adjacent each grommet 26 remote from the insulator 16. The retainers 30 include a plurality of gripping teeth 32 for gripping the exterior of the armored cables 12 and 14 for removing the shock and/or load to which the cables 12 and 14 are subjected from the electrical connectors 24. The retainers 30 include one or more longitudinal slots 34 whereby the teeth 32 may be more easily pressed inwardly to grip the exterior of the cables 12 and 14. Preferably, the armor and any insulation on the cables 12 and 14 extend into the retainers 30, but are stripped away from the electrical lines 20 prior to the insertion of the electrical lines 20 into the passages 28 of the grommets 26 and into the passages 22 of the insulator 16.

A protective metal housing is provided surrounding the insulator 16, grommets 26, and retainers 30 and includes a first 36 and a second 38 telescoping part. Means are provided for telescoping the first 36 and second 38 parts together such as a nut 40 which is threadably connected by coacting threads 42 to the first part 36 and which engages the second part 38 by coacting shoulders 44 and 46. Thus, rotation of the nut 40 relative to the housing part 36 telescopes the housing parts 36 and 38 together. Preferably, a pin 41 is provided in one of the housing parts such as part 36 which is movable in a groove 43 and the other housing part such as 38 for preventing rotation of the housing parts 36 and 38.

In order to securely lock the retainers 30 onto the cables 12 and 14 coacting wedge surfaces are provided between each of the housing parts 36 and 38 and one of the retainers 30 thereby causing the retainers 30 to grip the cables 12 and 14 when the first 36 and second 38 housing parts are telescoped together. Thus, coacting wedge surfaces 48 and 50 are provided between one of the retainers 30 and the housing part 36, respectively, and coacting wedge surfaces 52 and 54 are provided between the second housing part 38 and the second retainer 30, respectively, for causing the gripping teeth 30 to engage the exterior of the cables 12 and 14 when the housing parts 36 and 38 are telescoped together. This insures that any shock and/or loading between the cables 12 and 14 are supported by the housing parts 36 and 38 and are removed from the electrical connectors 24.

In addition, coacting shoulders are provided between each of the housing parts 36 and 38 in the opposite ends of the insulator 16 for compressing the resilient insulator 16 when the parts 36 and 38 are telescoped together to increase the sealing action of the resilient insulator 16 about the electrical connectors 24. Thus, coacting shoulders 56 and 58 are provided between the housing part 36 and one end of the insulator 16, respectively, and coacting shoulders 60 and 62 are provided between the second housing part 38 and the second end of the insulator 16, respectively.

Preferably one of the housing parts includes connecting means for supporting the electrical feedthrough 10. Thus, housing part 38 may include suitable threads 64 for threadably connecting to a supporting member 66 which may be connected to any fixed member such as well tubing.

The electrical power feedthrough 10 therefore mechanically supports and thoroughly seals the connection between the lines of the electrical cables 12 and 14 and protects the cable connectors 24 against environmental conditions and hydrostatic shock which exist in a downhole environment.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts, will readily suggest themselves to those skilled in the art and which are encompassed within the spirit of the invention and the scope of the appended claims.

What is claimed is:

1. An electrical power feedthrough for supporting and sealing a well electrical cable connection comprising,
    a sealing insulator having a cavity for holding and sealing an electrical connection,
    a sealing grommet at each end of the insulator for aligning the electrical cable with the insulator,
    a cable gripping retainer adjacent each grommet end remote from the insulator,
    a housing surrounding the insulator, grommets, and retainers, said housing including first and second telescoping housing parts,
    means for telescoping the first and second parts together, and
    coacting wedge means between each of the housing parts and one of the retainers for causing the retainers to grip the cable when the first and second housing parts are telescoped together.

2. The electrical power feedthrough of claim 1 including,
    coacting shoulders between each of the housing parts and opposite ends of the insulator.

3. The electrical power feedthrough of claim 1 wherein the insulator is longitudinally split for receiving said electrical connection and cable.

4. The electrical power feedthrough of claim 1 wherein at least one of the housing parts includes connecting means for connecting to and supporting the feedthrough.

5. An electrical power feedthrough connection supporting and sealing a multiple line well electrical cable comprising,
    a resilient sealing insulator which is longitudinally split and includes a plurality of cavities,
    a splice connector positioned in each cavity connecting the ends of two lines of the cable,
    a sealing grommet at each end of the insulator for aligning the lines of the electrical cable with the cavities of the insulator,
    a cable gripping retainer adjacent each grommet end remote from the insulator,
    a housing surrounding the insulator, grommets, and the retainers, said housing including first and second telescoping housing parts,
    threaded means for telescoping the first and second parts together,
    coacting wedge means between each of the housing parts and one of the retainers for causing the retainers to grip the cable when the first and second housing parts are telescoped together, and
    coacting shoulders between each of the housing parts and opposite ends of the insulator for compressing the insulator.

* * * * *